June 14, 1960 J. ENSINK 2,941,041

ARRANGEMENT FOR TRANSMITTING AUDIO-FREQUENCY SIGNALS AND RINGING SIGNALS BELOW THE AUDIO-FREQUENCY BAND

Filed Sept. 27, 1956

INVENTOR
JOHANNES ENSINK

BY Fred M. Vogel
AGENT 2,941,041
Patented June 14, 1960

2,941,041

ARRANGEMENT FOR TRANSMITTING AUDIO-FREQUENCY SIGNALS AND RINGING SIGNALS BELOW THE AUDIO-FREQUENCY BAND

Johannes Ensink, Hilversum, Netherlands, assignor, by mesne assignments, to North American Philips Company, Inc., New York, N.Y., a corporation of Delaware Filed Sept. 27, 1956, Ser. No. 612,421

Claims priority, application Netherlands Oct. 25, 1955

8 Claims. (Cl. 179—16)

This invention relates to telephone-system-arrangements for transmitting audio-frequency signals and ringing signals at frequencies below the audio-band frequencies, for example direct voltages, 50 c./s. ringing pulses or direct-current pulses over a transmission line, in which a negative impedance amplifier with positive feedback is connected in series-combination to the transmission line. In such a system the ringing signals appear with a considerably larger amplitude, across the terminals which connect the negative impedance amplifier to the transmission line, than do the audio-signals.

Such negative impedance amplifiers, in which suitable damping-reduction of the transmission line results from the positive feedback, may advantageously be used for four-wire or two-wire traffic.

This invention has for its object to provide a particularly advantageous transmission arrangement of the aforesaid type.

In accordance with the invention, an inductance comprising a saturable ferro-magnetic core is provided as a by-pass circuit for the ringing signals between the terminals connecting the negative impedance amplifier to the transmission line, which core is saturated on the appearance of a ringing signal, and furthermore the positive feedback circuit of the negative impedance amplifier is bridged by an inductance having a saturable ferro-magnetic core which is not saturated by the audio-signals but does become saturated on the occurrence of a voltage across the junction terminals of the negative impedance amplifier below the saturation voltage of the inductance acting as a by-pass circuit.

When using the expedient according to the invention, it is sufficient for the negative impedance amplifier to be proportioned only for the low level of the audio-signals and, moreover, a particularly simple transmission of the ringing signals with minimal losses results.

Figure 1:
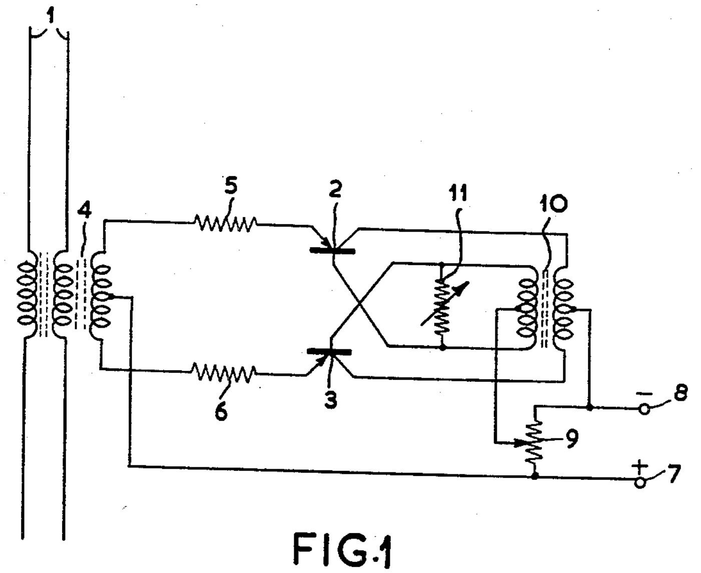
Figure 2:
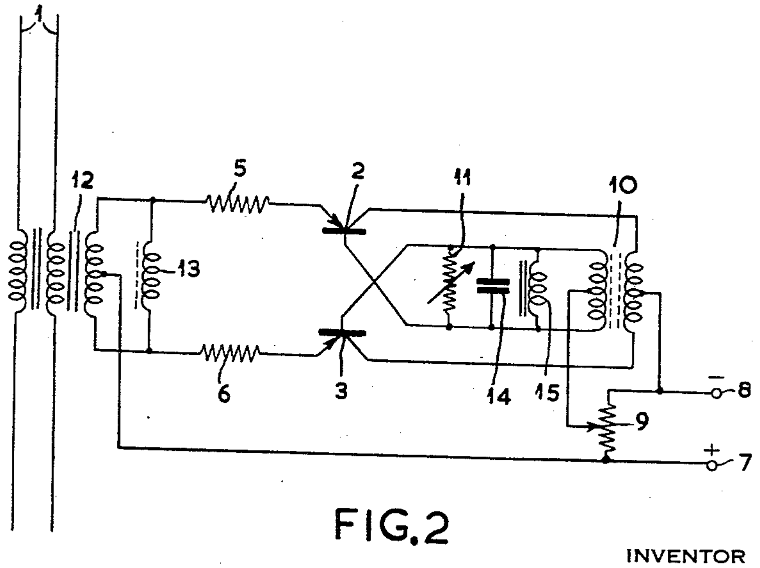

In order that the invention may be readily carried into effect, an example will now be described in detail with reference to the accompanying drawing, in which Fig. 1 shows a repeater station for two-wire traffic, which is designed in accordance with the invention, and Fig. 2 shows a variation of the repeater station represented in Fig. 1.

The repeater station shown in Fig. 1 is designed for two-wire traffic over a transmission line 1 for voice signals, contained for example, in the voice-frequency band of 300 c./s. to 3400 c./s. and ringing at a frequency below the voice-frequency band, which ringing signals are formed by a low-frequency alternating voltage of 50 c./s., the two conductors of the transmission line 1 carrying a push-pull voltage relative to earth.

In order to amplify the voice signals in the two traffic directions, the repeater station comprises a signal amplifier which is a negative impedance amplifier and comprises two push-pull connected transistors 2, 3, which signal amplifier is connected through a junction transformer 4 to the transmission line 1. The emitter-electrodes of the transistors 2, 3 are connected through resistors 5, 6 serving for direct current stabilization to the secondary winding of the transformer 4, a centre tap of which is connected to the positive terminal 7 of a voltage supply, while the collector-electrodes and the base-electrodes of the transistors 2, 3 are connected respectively to the negative terminal 8 of the voltage supply and to a tapping point of a voltage divider 9 situated between the terminals 7, 8 of the voltage supply.

The transistor-amplifier referred to comprises a positive feedback circuit with a feedback transformer 10 situated between the collector- and base circuits of the transistors 2, 3, through which positive feedback the transistor-amplifier constitutes a negative series-impedance for the transmission line 1 and thus reduces the damping of the transmission line 1. The degree of damping-reduction of the transmission line 1 may be set to a suitable value by means of a variable resistor 11 which is connected in parallel with the secondary winding of the feedback transformer 10, this value being, for instance, 7 db in this example.

With regard to transmission in both communication directions of the ringing signals, which have a considerably higher voltage level, for example 100 v., than the voice signals at the junctions of the negative impedance amplifier, the junction transformer 4 between the terminals of the negative impedance amplifier acts at the same time as a by-pass circuit for the ringing signals. To this end, the transformer has a saturable core which becomes saturated on the occurrence of a ringing signal. The feedback transformer 10 moreover comprises a saturable ferro-magnetic core which becomes saturated at a voltage on the junction transformer 4 lower than the saturation voltage of this transformer 4.

When transmitting voice signals, which are at a considerably lower voltage level, for example 4 v., than the ringing signals, the ferromagnetic cores of the junction transformer 4 and the feedback transformer 10 are not saturated and the arrangement as described functions as a negative impedance amplifier with respect to the voice signals in normal manner. On the occurrence, however, of a ringing signal constituted by a 50 c./s. alternating voltage at a voltage level appreciably exceeding that of the voice signals, the core of the junction transformer 4 becomes saturated as soon and as long as the instantaneous value of the 50 c./s. alternating voltage exceeds the saturation level of the core of the junction transformer 4. The impedance of the by-pass circuit constituted by the junction transformer 4 with respect to the ringing signals decreases to a minimal value and practically constitutes a short-circuit between the terminals of the negative impedance amplifier in order to permit the 50 c./s. alternating voltage to by-pass the negative impedance amplifier with a minimum voltage loss, it being sufficient for the negative impedance amplifier to be proportioned only for the comparatively low level of the voice signals.

In the absence of said saturable core in the feedback transformer 10, the transistor-amplifier, being positively fed back via the feedback transformer 10, tends to self-oscillate due to failure of the load of the transistor-amplifier in the emitter circuit, which load is constituted by the transmission line and forms a negative feedback, said self-oscillation persisting even after failure of the ringing signal. As a matter of fact, the oscillations then produced by the transistor-amplifier 2, 3 will, in general, have an amplitude sufficient to exceed the saturation level of the core of the junction transformer in the emitter circuit.

In the system referred to, in which the feedback transformer 10 comprises a ferromagnetic core which becomes saturated on the occurrence of a voltage on the transformer 4 below the saturation voltage of the core of this transformer, this feedback transformer 10 becomes saturated even before the oscillations in the emitter circuit reaching the saturation level of the core of the junction transformer, thus preventing any self-oscillation of the transistor amplifier upon failure of the ringing signal. In this respect it is pointed out that when designing the negative impedance amplifier in such manner that the oscillations at the junction transformer 4 have an amplitude smaller than that of those across the feedback transformer 10, the saturation levels of the transformers 4 and 10 may be made equal to each other.

This system has the important advantage that the saturation level of the junction transformer for the ringing signals may be made lower than the maximum voltage level of the voice signals. As a matter of fact, the saturation level of the ferromagnetic core increases with an increase in frequency, hence the losses are minimized during transmission of the ringing signals via the by-pass circuit. It is advantageous to use high-permeability material for the core of the transformers 4, 10, for example a permeability of 10,000 or higher, thus minimizing the self-inductance upon saturation of the transformer cores. These two expedients may reduce the total loss down to 1 v. in transmitting the ringing signals.

A practicable system as explicitly described in the foregoing had the following ratings:

| | |
|---|---|
| Transistors 2, 3 of the Philips type | OC 71. |
| Direct-current stabilization resistors 5, 6 | 200 Ω. |
| Winding ratio of the transformers 4, 10 | 1:1. |
| Permeability of transformer core | 10,000. |
| Size of the transformers | 2 by 2 by 2 cms. |

The whole amplifying station is enclosed in a plastic box 4.5 by 4.5 by 5.5 cms.

Fig. 2 shows a variation of the amplifying station represented in Fig. 1, which may advantageously be used when transmitting a power supply direct voltage together with the voice signals. Corresponding elements are provided with the same reference numerals.

In this system, the negative impedance amplifier is connected to the transmission line 1 through a transformer 12 non-saturated by the transmitted power supply direct current, while the by-pass circuit for the 50 c./s. ringing signal pulses, which is connected in parallel with the secondary winding of the transformer 12, is a coil 13 with a ferromagnetic core saturated by the ringing-signal pulses.

In order to prevent frequency dependent amplification of the negative impedance amplifier in this system which is due to stray capacities of the junction transformer 12 and the self-induction of the coil 13, the feedback circuit of the negative impedance amplifier comprises the parallel combination of a coil 15 and a capacitor 14.

On the occurrence of a 50 c./s. ringing signal pulse in the system, the coil 13 becomes saturated and the arrangement behaves quite similarly as described explicitly with reference to Fig. 1. Alternatively, a transformer may be substituted for the coil 13 to act as a by pass circuit for the ringing signals.

In this respect it is to be noted that the negative impedance amplifier may alternatively be connected to the transmission line in a different manner, for example via coupling capacitors, a coil having a saturable core then being provided as a by-pass circuit for the ringing signals between the terminals. As a further alternative, instead of employing transformer-coupled feedback of the negative impedance amplifier, the positive feedback may be effected differently. For example, the bases and the collectors of the transistors may be coupled crosswise via coupling capacitors, this positive feedback circuit being shunted by a coil having a saturable core. Characteristic of all these forms is an inductance having a core saturable by the ringing signals, which inductance is connected between the terminals of the negative impedance amplifier, while the feedback-circuit of the negative impedance amplifier comprises an inductance having a saturable core which becomes saturated earlier than the core of the by-pass circuit constituted by the inductance.

What is claimed is:

1. A transmission circuit comprising a transmission line, a source of audio-frequency signals coupled to said line, a source of ringing signals coupled to said line, said ringing signals having a frequency lower than that of said audio-frequency signals and having an amplitude which is greater than that of said audio-frequency signals, a negative impedance amplifier having a positive feedback circuit, a pair of terminals connecting said amplifier in series combination with said transmission line, a first inductance having a saturable ferromagnetic core and connected across said terminals, said core having a saturation level such that it is saturable upon the occurrence of said ringing signals and is non-saturable upon the occurrence of said audio-frequency signals, and a second inductance having a saturable ferromagnetic core and connected in said positive feedback circuit, said second inductance core having a saturation level such that it is non-saturable upon the occurrence of said audio-frequency signals and is saturable upon the saturation of said first core upon the occurrence of said ringing signals.

2. A circuit as claimed in claim 1, including a transformer connected across said terminals and coupling said amplifier in series combination with said transmission line, said transformer having a saturable ferromagnetic core whereby a winding of said transformer constitutes said first inductance.

3. A circuit as claimed in claim 1, including a feedback transformer connected in said positive feedback circuit, said feedback transformer having a saturable ferromagnetic core whereby a winding of said transformer constitutes said second inductance.

4. A circuit as claimed in claim 1, including a source of direct current connected to said transmission line whereby said transmission line transmits said direct current simultaneously with said audio-frequency signals, and including a transformer connected across said terminals and coupling said amplifier in series combination with said transmission line, said transformer having a core which does not saturate upon the occurrence of said direct current, said first inductance being connected across a winding of said transformer.

5. A circuit as claimed in claim 4, in which said positive feedback circuit includes a coil and capacitor connected in parallel for stabilizing the amplification of said amplifier with respect to frequency.

6. A circuit as claimed in claim 1, in which the permeability of each of said cores is 10,000 or higher.

7. A circuit as claimed in claim 1, in which said positive feedback circuit produces sufficient feedback so that the signals across said second inductance have a greater amplitude than that of the signals across said first inductance, said first and second inductance cores having equal saturation levels.

8. A circuit as claimed in claim 1, in which the saturation level of said first inductance core is higher than that of said second inductance.

No references cited.